(12) United States Patent
Yamamoto

(10) Patent No.: US 12,712,386 B2
(45) Date of Patent: Aug. 18, 2026

(54) POWER FEEDER

(71) Applicant: Daifuku Co., Ltd., Osaka (JP)

(72) Inventor: Masaaki Yamamoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 380 days.

(21) Appl. No.: 18/431,264

(22) Filed: Feb. 2, 2024

(65) Prior Publication Data

US 2024/0266875 A1 Aug. 8, 2024

(30) Foreign Application Priority Data

Feb. 3, 2023 (JP) ................................ 2023-015516

(51) Int. Cl.
*H02J 50/10* (2016.01)
*H01R 4/70* (2006.01)

(52) U.S. Cl.
CPC ................ *H02J 50/10* (2016.02); *H01R 4/70* (2013.01)

(58) Field of Classification Search
CPC ...... H01R 43/045; H01R 43/055; H01R 4/70; B60L 13/00; B60L 5/00; B60M 7/00
USPC ............................................ 439/521, 620.09
See application file for complete search history.

(56) References Cited

U.S. PATENT DOCUMENTS

2014/0070903 A1* 3/2014 Wu .......................... H01G 4/40
361/301.2

FOREIGN PATENT DOCUMENTS

JP 2002178800 A * 6/2002

OTHER PUBLICATIONS

Foreign translation for JP 2002178800 A (Year: 2002).*

* cited by examiner

*Primary Examiner* — Tulsidas C Patel
*Assistant Examiner* — Thaslimur Rahman
(74) *Attorney, Agent, or Firm* — The Webb Law Firm

(57) ABSTRACT

A power feeder includes a feed line along a movement path for a movable body to supply power contactlessly to the movable body, and a thermosensitive line along the movement path together with the feed line. The feed line includes a first line, a second line, and a connector connecting the first line and the second line to each other. The connector includes a conductive connection pair electrically connecting the first line and the second line to each other, and an insulating cover covering the conductive connection pair. The insulating cover is formed from an insulating material. The insulating cover has a groove extending in an extension direction of the feed line. The thermosensitive line is disposed in the groove.

4 Claims, 5 Drawing Sheets

POWER FEEDER

CROSS-REFERENCE TO RELATED APPLICATION

This application claims priority to Japanese Patent Application No. 2023-015516 filed Feb. 3, 2023, the disclosure of which is hereby incorporated by reference in their entirety.

BACKGROUND OF THE INVENTION

Field of the Invention

The present invention relates to a power feeder including a feed line along a movement path of a movable body to supply power contactlessly to the movable body, and a thermosensitive line along the movement path together with the feed line.

Description of Related Art

For example, Japanese Unexamined Patent Application Publication No. 2002-178800 (Patent Literature 1) describes a technique for a power feeder. Reference signs in parentheses used hereafter in describing the background are the reference signs in Patent Literature 1.

The power feeder in Patent Literature 1 includes a feed line along a transport path for a movable body (transporter 1) to supply power contactlessly to the movable body, and a terminal block (27) for connection of the feed line. The feed line includes multiple lines (modular feed lines 24) each having a predetermined length and having connection terminals (25) at their both ends. The multiple lines (modular feed lines 24) are connected to one another with the terminal block (27). The terminal block (27) has grooves (28) extending along the lines. When the connection terminals (25) are fitted into the grooves (28), the multiple lines are connected to one another with the terminal block (27).

The above power feeder may include a thermosensitive line along the feed line to detect, for example, abnormal heat. To appropriately detect abnormal heat at or around the feed line, the thermosensitive line may be located to be in contact with the lines or the terminal block. To install the thermosensitive line to be in contact with the terminal block, for example, the thermosensitive line may be tied to the terminal block with a cable tie. However, this method includes connecting the lines and the terminal block to one another as well as winding the cable tie around the thermosensitive line and the terminal block. The method is thus likely to increase the workload of an operator. In addition, simply tying the thermosensitive line to the terminal block with a cable tie is likely to vary the positional relationship between the thermosensitive line and the terminal block, and may cause inappropriately detection of heat at or around the terminal block.

SUMMARY OF THE INVENTION

A power feeder for supplying power contactlessly is thus awaited to appropriately detect heat at or around a feed line with a thermosensitive line installed in a simple manner.

A power feeder according to one or more aspects of the present disclosure includes a feed line along a movement path for a movable body to supply power contactlessly to the movable body, and a thermosensitive line along the movement path together with the feed line. The feed line includes a first line, a second line, and a connector connecting the first line and the second line to each other. The connector includes a conductive connection pair electrically connecting the first line and the second line to each other, and an insulating cover covering the conductive connection pair. The insulating cover is formed from an insulating material. The insulating cover has a groove extending in an extension direction of the feed line. The thermosensitive line is disposed in the groove.

In this structure, the first line and the second line in the feed line are connected to each other with the connector. The connector includes the insulating cover formed from an insulating material and covering the conductive connection pair. The first line and the second line can thus be easily connected, with the connection between the first line and the second line covered with the insulating cover formed from an insulating material. Compared with a structure including the first line and the second line in the feed line connected with, for example, a terminal block, this structure is more likely to simplify installation of the feed line and facilitate the safety with less exposure of an energized portion to outside after the installation.

In this structure, the groove on the insulating cover extends in the extension direction of the feed line. Thus, placing the thermosensitive line into the groove completes the installation of the thermosensitive line along the feed line, and simplifies installation of the thermosensitive line.

In this structure, the thermosensitive line is disposed in the groove on the insulating cover. Thus, as compared with a structure including the thermosensitive line along the outer surface of the insulating cover, this structure has less variation in the positional relationship between the thermosensitive line and the connector, and allows the thermosensitive line to be nearer the conductive connection pair in the connector. This structure thus facilitates appropriate detection of heat at the conductive connection pair.

In this structure, the power feeder for supplying power contactlessly can appropriately detect heat at or around the feed line with the thermosensitive line installed in a simple manner.

Further aspects and advantages of the power feeder will be apparent from exemplary and nonlimiting embodiments described below with reference to the drawings.

DESCRIPTION OF THE INVENTION

First Embodiment

A power feeder according to a first embodiment will be described below with reference to the drawings. In the example described below, the power feeder supplies power to an article transport vehicle at an article transport facility.

Figure 1:
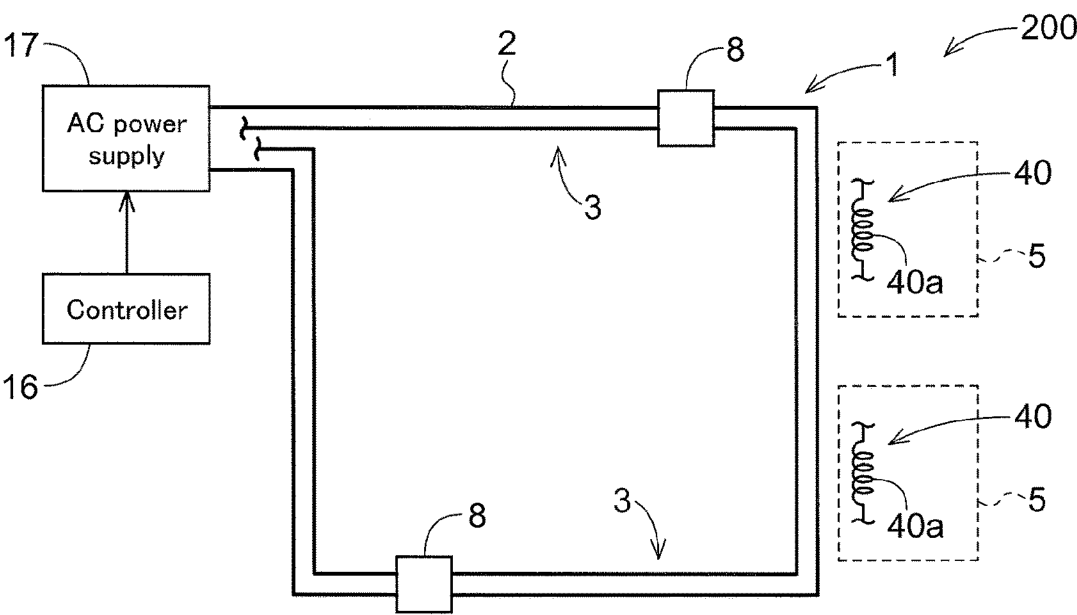
FIG. 1 is an overall plan view of an article transport facility including a power feeder.
Figure 2:
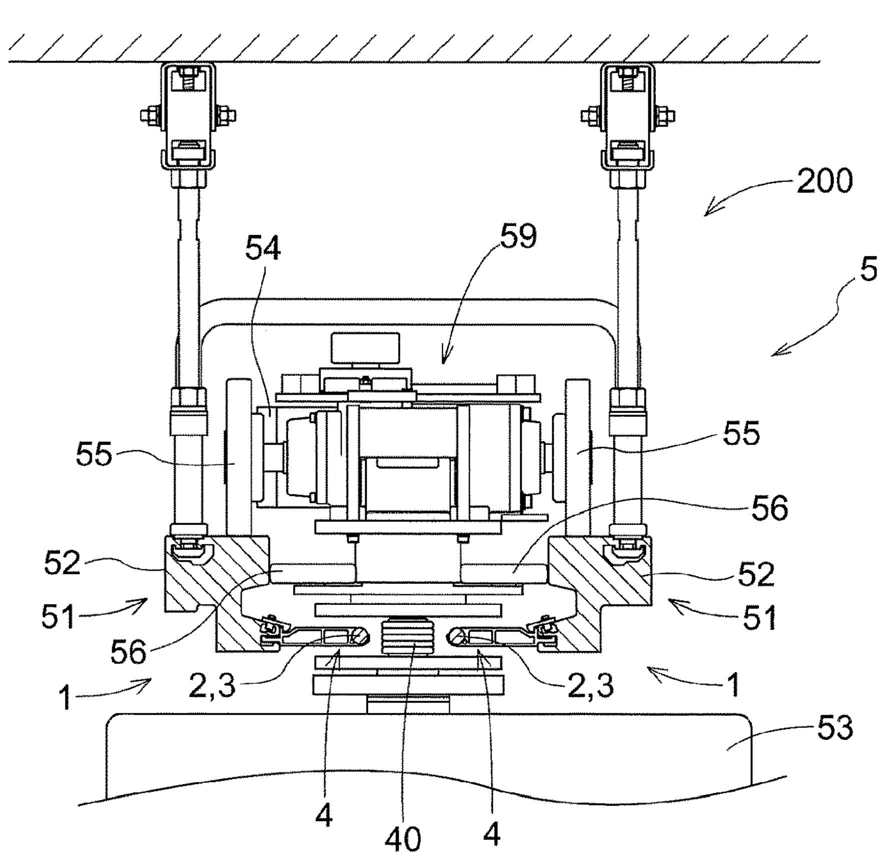
FIG. 2 is a front view of a movable body.

As shown in FIGS. 1 and 2, movable bodies 5 or article transport vehicles at an article transport facility 200 travel on travel rails 52 along a movement path 51 serving as a travel path. As shown in FIG. 1, a power feeder 1 includes feed lines 2 along the movement path 51 for the movable bodies 5 to supply power contactlessly to the movable bodies 5, and thermosensitive lines 3 extending along the movement path 51 together with the feed lines 2.

As shown in FIG. 2, each movable body 5 includes a traveler 59 that travels along the movement path 51 as being guided along a pair of travel rails 52 hung from a ceiling, a transport vehicle body 53 located below the travel rails 52 and hung from the traveler 59, and a power receiver 40 that contactlessly receives driving power from the feed lines 2 extending along the movement path 51. The transport vehicle body 53 includes an article support (not shown) that is vertically movable relative to the transport vehicle body 53 and supports an article being hung. The movable bodies 5 transport, for example, front opening unified pods (FOUPs) holding semiconductor substrates or glass substrates to be used as materials for displays.

As shown in FIG. 2, the traveler 59 includes a pair of drive wheels 55 rotatably drivable by an electric drive motor 54. The drive wheels 55 roll on the upper surfaces of the travel rails 52 that serve as travel surfaces. The traveler 59 further includes a pair of guide wheels 56 that are rotatable about axes extending in the vertical direction (about vertical axes). The pair of guide wheels 56 are in contact with inner side surfaces of the pair of travel rails 52. The traveler 59 further includes components such as the drive motor 54 for traveling and its drive circuit to cause the movable body 5 to travel along the travel rails 52. The transport vehicle body 53 includes components such as an actuator that raises and lowers the article support, an actuator that drives a gripper for gripping an article, and drive circuits for driving these components.

Power for components such as the drive motor 54, various actuators, and drive circuits for driving these components is fed contactlessly from the feed lines 2 to the power receiver 40. In the present embodiment, the feed lines 2, which supply driving power to the movable body 5 through the power receiver 40, are located on both sides of the power receiver 4 in a path width direction (hereafter simply referred to as a path width direction) that is parallel to the power receiver 40 and perpendicular to a direction along the movement path 51. The feed lines 2 extend along the movement path 51 for the movable body 5. The extension direction of the feed lines 2 thus matches the direction along the movement path 51.

The article transport facility has an AC power supply 17 and a Controller 16 that controls the AC power supply 17. In the present embodiment, the AC power supply 17 supplies driving power to the movable bodies 5 with a wireless power feed technology called high efficiency inductive power distribution technology (HID). More specifically, a high-frequency current is applied through the feed lines 2 serving as guide-path wires to generate a magnetic field around the feed lines 2. The power receiver 40 includes a pickup coil **40*a* and a magnetic core. The pickup coil 40*a*** is induced by electromagnetic induction from the magnetic field. The induced alternating current power is converted to direct current power by a power receiver circuit (not shown) including, for example, a rectifier circuit such as a full-wave rectifier and a smoothing capacitor, and is supplied to the actuators and the drive circuits.

An article transport vehicle or a ceiling transport vehicle is herein the movable body 5, but the movable body 5 may be, for example, an article transport vehicle that travels on the ground, a travel cart that travels along travel paths corresponding to the levels of an article rack, or a travel cart of a stacker crane. The movable body 5 may be in any form that operates with power from the feed lines 2 along the movement path 51. The movable body 5 is not limited to an article transport vehicle.

As shown in FIG. 1, the thermosensitive lines 3 extend throughout the feed lines 2 in the power feeder 1 to detect abnormal heat at or around the feed lines 2. Each thermosensitive line 3 includes a pair of conducting wires (not shown) covered with insulators that soften at a preset temperature. One conducting wire is a sheath conductor wire including a core wire formed from a conductor covered with an insulator. Two conducting wires are twisted into a twist pair or a stranded wire, which is then covered with a sheath to form the thermosensitive line 3 including a pair of conducting wires. The pair of conducting wires are short-circuited when the insulators soften and the core wires formed from conductors come into contact with each other. The thermosensitive line 3 including the pair of conducting wires is covered with the sheath, and thus, the thermosensitive line 3 does not allow the core wires to be exposed outside independent of when the insulators soften. The thermosensitive lines 3 may be located to be in contact with the feed lines 2. Although not shown, the thermosensitive lines 3 are located outward from and adjacent to the pair of feed lines 2 in the path width direction. The pair of feed lines 2 are located on both sides of the power receiver 40 in the path width direction. The sheaths of the thermosensitive lines 3 are in contact with insulating coatings of the feed lines 2.

For the article transport facility 200 with a large scale, the power feeder 1 has a large scale and may include one or more feed lines 2 including multiple lines connected to one another. The multiple lines are electrically connected to one another with connectors 8 (FIGS. 1, 3, and 4) or terminal blocks (not shown) in between. To connect the lines to a wire of, for example, a control panel as well, the connectors 8 or the terminal blocks may be used. The power feeder 1 according to the embodiment includes the connector 8 as described below.

Figure 3:
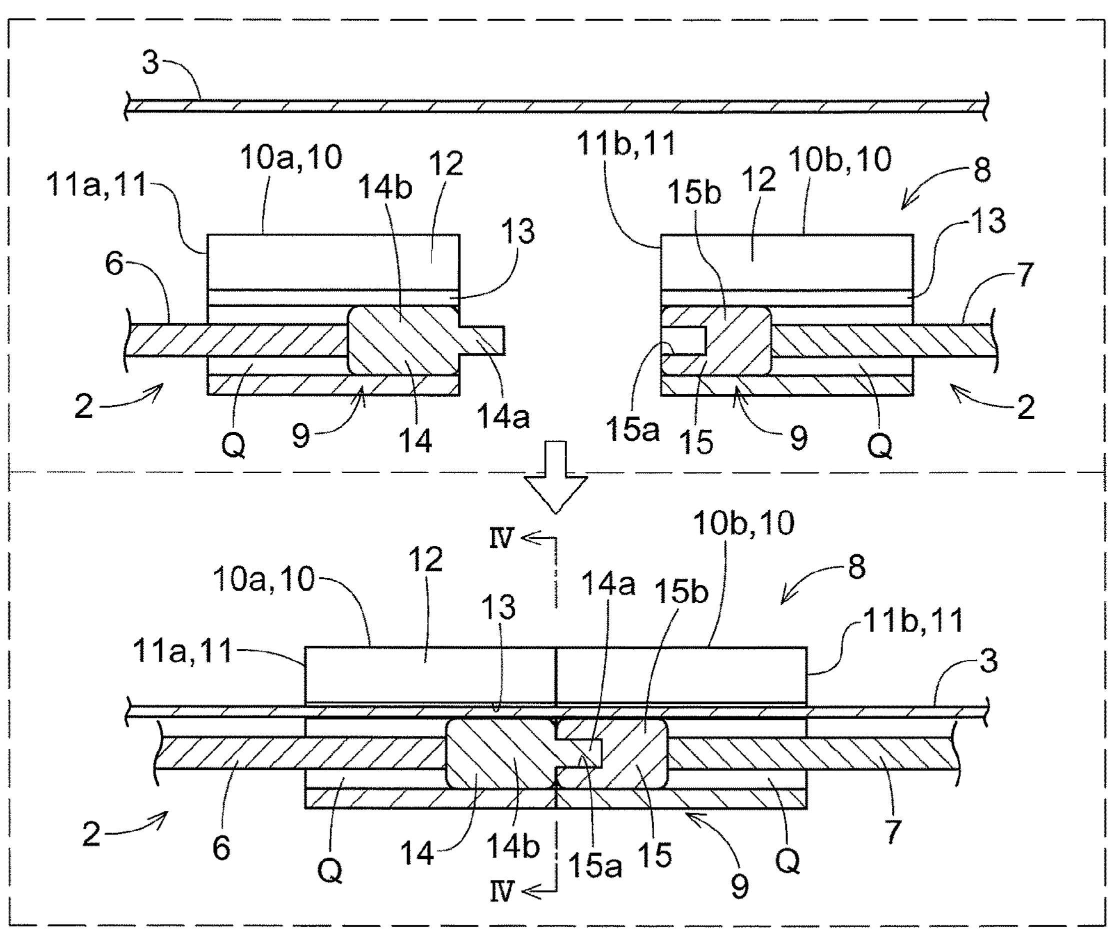
FIG. 3 is a side cross-sectional view of a connector.

As shown in FIG. 3, each feed line 2 includes a first line 6, a second line 7, and connectors 8 that connect the first line 6 and the second line 7 to each other. In the present embodiment, each feed line 2 is divided into multiple lines that are connected to one another with the connectors 8. The structure described below includes the first line 6 and the second line 7 among the multiple lines in one feed line 2 connected to each other with one of the connectors 8. The lines have the same structure. The first line 6 and the second line 7 have the same structure. As described above, each feed line 2 may be divided into two, or more than two lines. The lines (the first line 6 and the second line 7) each include a conductor wire (not shown) through which alternating current passes, and an insulating coating covering the periphery of the conductor wire. In the present embodiment, the conductor wire is a guide-path wire that supplies power contactlessly.

As shown in FIG. 3, each connector 8 includes a conductive connection pair 9 that electrically connects the first line 6 and the second line 7 to each other, and an insulating cover 10 formed from an insulating material and covering the conductive connection pair 9. In the present embodiment, the insulating cover 10 covers the entire area in which the first line 6 and the second line 7 are connected (in other words, the conductive connection pair 9, the connection between the first line 6 and the conductive connection pair 9, and the connection between the second line 7 and the conductive connection pair 9), with the first line 6 and the second line 7 being connected to each other with the conductive connection pair 9. In this example, an elastic member formed from an insulating material is used as the insulating cover 10. The elastic member is more likely to facilitate attachment of the conductive connection pair 9 or the thermosensitive line 3 (described later) to the insulating cover 10.

As shown in FIG. 3, the conductive connection pair 9 includes a first connection 14 at an end of the first line 6, and a second connection 15 at an end of the second line 7. The first connection 14 and the second connection 15 are conductor portions in the connectors 8. When the first connection 14 and the second connection 15 are connected, the first line 6 and the second line 7 are electrically connected. The first connection 14 and the second connection 15 are fittable to each other. The first connection 14 includes a first body 14*b* fixed to the first line 6, and a fitting portion 14*a* protruding outward from the first body 14*b* in an extension direction of the first line 6. The second connection 15 includes a second body 15*b* fixed to the second line 7, and a receiving portion 15*a*. When the fitting portion 14*a* fits to the receiving portion 15*a*, the first line 6 and the second line 7 are connected. In the example in FIG. 3, the fitting portion 14*a* protrudes, and the receiving portion 15*a* is recessed inward in the extension direction of the second line 7 from a surface of the second body 15*b* (the surface facing the first connection 14). When the fitting portion 14*a* is fitted into the recess on the receiving portion 15*a*, the first connection 14 and the second connection 15 are fitted to each other.

Figure 4:
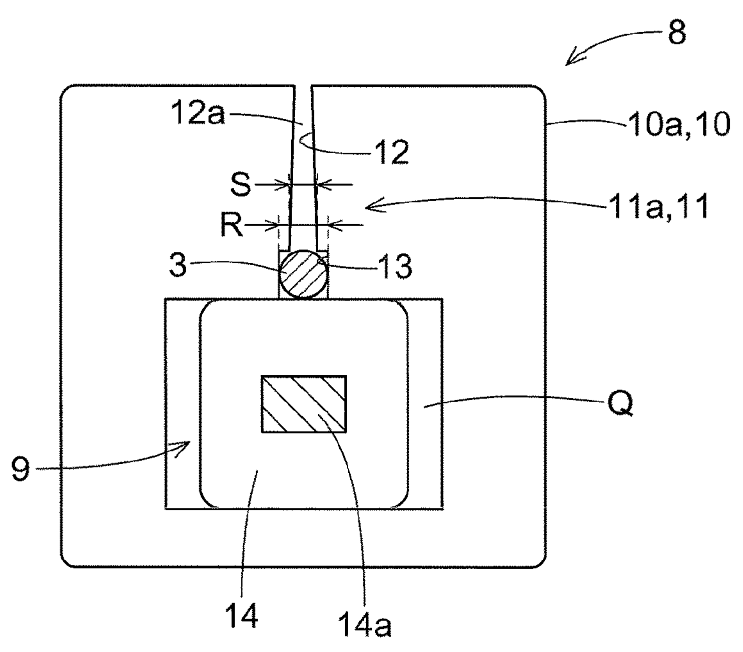
FIG. 4 is a front cross-sectional view of the connector (cross-sectional view taken along line IV-IV in FIG. 3).

In the present embodiment, as shown in FIGS. 3 and 4, the insulating cover 10 has an accommodation space Q accommodating the conductive connection pair 9. The accommodation space Q extends through the insulating cover 10 in the extension direction of the feed lines 2. The accommodation space Q accommodates the conductive connection pair 9. In the example in FIG. 2, the accommodation space Q accommodates, in addition to the conductive connection pair 9 (the first connection 14 and the second connection 15), a part of the feed line 2 (the first line 6 and the second line 7) connected to the conductive connection pair 9.

As shown in FIGS. 3 and 4, the insulating cover 10 includes a first cover section 10*a* that covers the first connection 14, and a second cover section 10*b* that covers the second connection 15. The accommodation space Q is defined in each of the first cover section 10*a* and the second cover section 10*b*. The first cover section 10*a* accommodates the first line 6 in its accommodation space Q to cover the first connection 14. The second cover section 10*b* accommodates the second line 7 in its accommodation space Q to cover the second connection 15. In this example, the first cover section 10*a* and the second cover section 10*b* have the same structure. The accommodation space Q is smaller than the dimensions of the conductive connection pair 9 (the first connection 14 and the second connection 15) in the vertical direction and the path width direction. As described above, the insulating cover 10 is an elastic member. The first connection 14 is pushed into the first cover section 10*a* from outside the first cover section 10*a* to be accommodated in the accommodation space Q. Similarly, the second connection 15 is pushed into the second cover section 10*b* from outside the second cover section 10*b* to be accommodated in the accommodation space Q. Thus, the first connection 14 is fixed to the first cover section 10*a*, and the second connection 15 is fixed to the second cover section 10*b*.

As shown in FIGS. 3 and 4, the insulating cover 10 has a groove 11 extending in the extension direction of the feed lines 2. The thermosensitive line 3 is disposed in the groove 11. In the present embodiment, the groove 11 extends throughout the insulating cover 10 in the extension direction of the feed lines 2. In this example, as shown in FIG. 4, the thermosensitive line 3 is disposed in the groove 11 to be in contact with the conductive connection pair 9. When the thermosensitive line 3 extends along the feed line 2, abnormal heat at the connection (at or around the connector 8) can be appropriately detected at the connection between the first line 6 and the second line 7 as well.

As shown in FIGS. 3 and 4, the groove 11 has an opening 12 that is open in the outer peripheral surface of the insulating cover 10, and a compartment 13 located nearer the conductive connection pair 9 than the opening 12 and accommodating the thermosensitive line 3. In this example, the opening 12 is open in the surface of the insulating cover 10 facing upward. The compartment 13 is located between the opening 12 and the accommodation space Q in the insulating cover 10. The compartment 13 is continuous with the opening 12. The thermosensitive line 3 is placed into the opening 12 and disposed in the compartment 13. In the illustrated example, the opening 12 includes a path 12*a* that connects the opening end of the opening 12 and the compartment 13. The compartment 13 is wider than the opening 12. In the present embodiment, the opening 12 has an opening width S smaller than a diameter R of the thermosensitive line 3. The opening 12 can thus restrict the thermosensitive line 3 accommodated in the compartment 13 from slipping off the insulating cover 10. The opening width S is a dimension perpendicular to the extension direction of the feed lines 2 (the direction in which the groove 11 extends in this example), or a dimension in the path width direction. In the illustrated example, the opening width S is the maximum dimension of the opening 12 in the path width direction. In other words, the diameter R of the thermosensitive line 3 is greater than the maximum dimension of the opening 12 in the path width direction.

In the present embodiment, as shown in FIGS. 3 and 4, the groove 11 includes a first groove section 11*a* on the first cover section 10*a*, and a second groove section 11*b* on the second cover section 10*b*. In the present embodiment, the first groove section 11*a* and the second groove section 11*b* have the same structure. More specifically, the first groove section 11*a* and the second groove section 11*b* each include the opening 12 and the compartment 13 described above. The first cover section 10*a* and the second cover section 10*b* are fitted to each other. In the first cover section 10*a* and the second cover section 10*b* fitted to each other, the first groove section 11*a* and the second groove section 11*b* extend continuously in the extension direction of the feed lines 2. In this example, when the first connection 14 and the second connection 15 are fitted to each other in the above manner, the first cover section 10*a* and the second cover section 10*b* are fitted to each other. In the first cover section 10*a* and the second cover section 10*b* fitted to each other, the opening 12 in the first groove section 11*a* and the opening 12 in the second groove section 11*b* are continuous with each other, and the compartment 13 in the first groove section 11*a* and the compartment 13 in the second groove section 11*b* are continuous with each other. In the illustrated example, the fitting portion 14*a* and the receiving portion 15*a* each have a rectangular shape. This positions the fitting portion 14*a* and the receiving portion 15*a* relative to each other.

Figure 10:
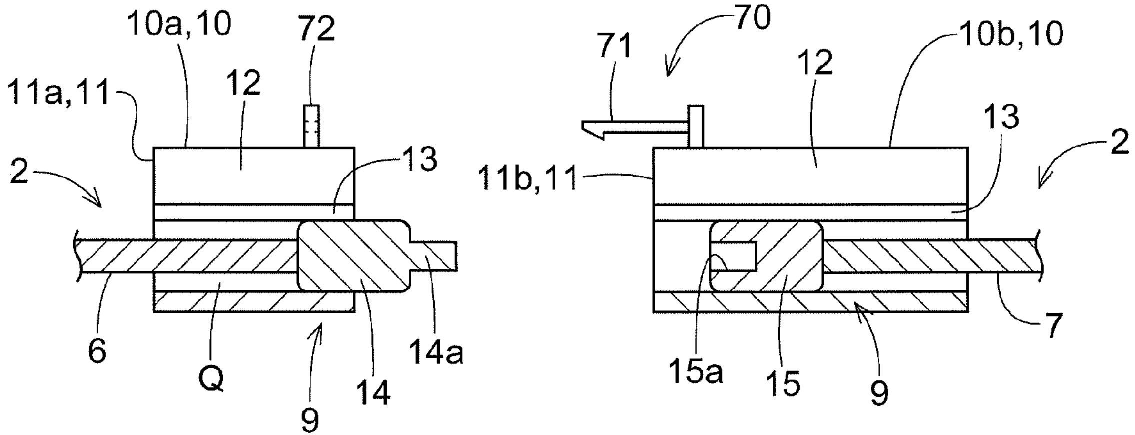
FIG. 10 is a side cross-sectional view of a connector in another embodiment.

With the fitting portion 14*a* and the receiving portion 15*a* being fitted, the first groove section 11*a* and the second groove section 11*b* extend continuously in the extension direction of the feed lines 2. The fitting portion 14*a* and the receiving portion 15*a* may have any shape other than the rectangle. As shown in FIG. 10, a lock assembly 70 may be located on the first cover section 10*a* and the second cover section 10*b*. In the example shown in FIG. 10, the lock assembly 70 includes a receiving portion 72 and a locking portion 71. When the receiving portion 72 is locked on the locking portion 71, the first cover section 10*a* and the second cover section 10*b* may be fitted to each other. In the illustrated example, the receiving portion 72 is located on the first cover section 10*a*, and the locking portion 71 is located on the second cover section 10*b*. When the distal end of the locking portion 71 is placed into a through-hole in the receiving portion 72, the locking portion 71 locks on the receiving portion 72.

In the example shown in FIGS. 3 and 4, the opening 12 in each of the first groove section 11*a* and the second groove section 11*b* has a smaller dimension in the path width direction as it extends upward. The compartment 13 is sized for the diameter R of the thermosensitive line 3. The compartment 13 has a smaller dimension than the accommodation space Q in the path width direction. The compartment 13 is open to the accommodation space Q. The thermosensitive line 3 accommodated in the compartment 13 is thus in contact with the conductive connection pair 9 (the first connection 14 and the second connection 15). The procedure of connecting the first line 6 and the second line 7 to each other and accommodating the thermosensitive line 3 in the insulating cover 10 will be described below with reference to FIG. 3.

First, the first line 6 to which the first connection 14 and the first cover section 10*a* are attached and the second line 7 to which the second connection 15 and the second cover section 10*b* are attached are connected to each other. More specifically, the fitting portion 14*a* of the first connection 14 is placed into the receiving portion 15*a* of the second connection 15. The thermosensitive line 3 is then placed into the opening 12 in the insulating cover 10 and accommodated in the compartment 13. In the example in FIG. 4, the connector 8 is oriented with the opening of the opening 12 facing upward, but may be oriented with the opening of the opening 12 facing laterally.

Second Embodiment

Figure 5:
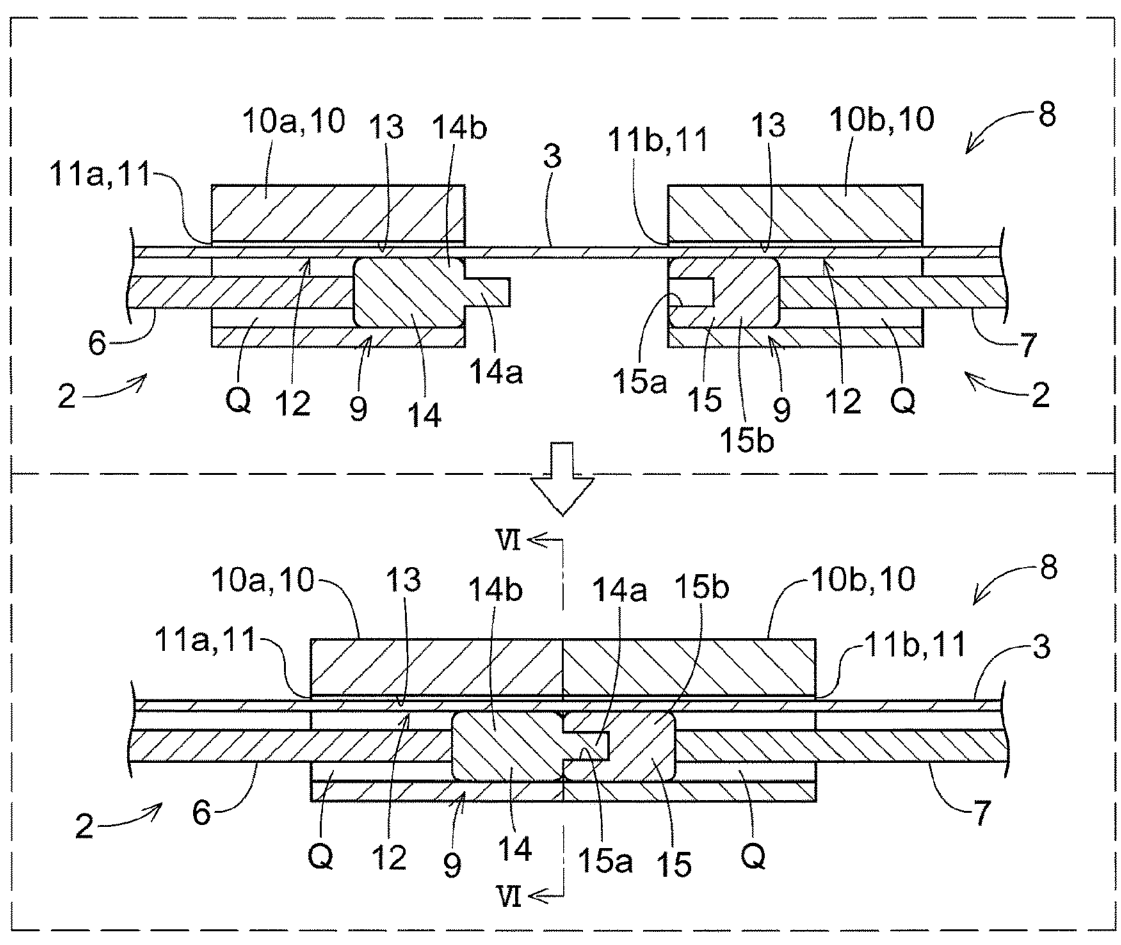
FIG. 5 is a side cross-sectional view of a connector in another embodiment.
Figure 6:
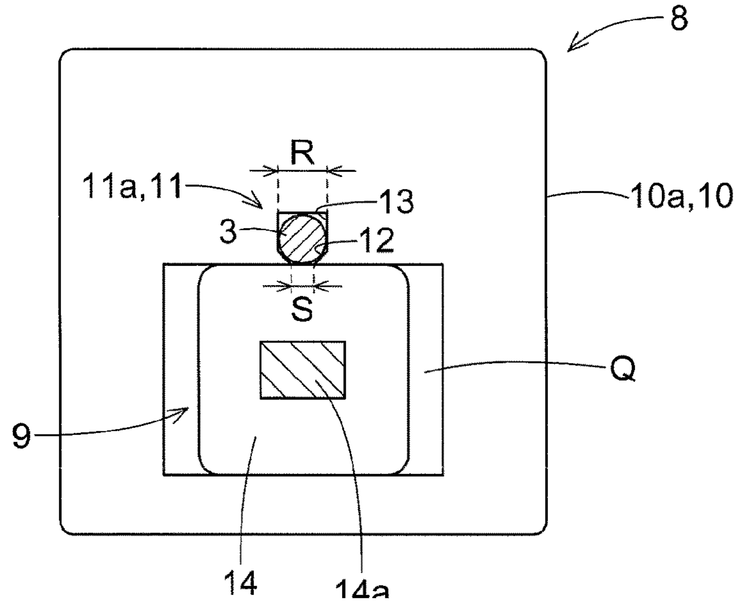
FIG. 6 is a front cross-sectional view of the connector in the other embodiment (cross-sectional view taken along line VI-VI in FIG. 5).

A power feeder 1 according to a second embodiment will be described with reference to the drawings (FIGS. 5 and 6). The power feeder 1 according to the present embodiment will be described below focusing on its differences from the power feeder according to the first embodiment. The components not described herein are the same as those in the first embodiment, and denoted with the same reference signs and will not be described in detail.

As shown in FIGS. 5 and 6, in the present embodiment, the insulating cover 10 has the accommodation space Q accommodating the conductive connection pair 9. The groove 11 includes the opening 12 that is open to the accommodation space Q in the insulating cover 10 and the compartment 13 located farther from the conductive connection pair 9 than the opening 12 and accommodating the thermosensitive line 3. In this example, the opening 12 is located between the compartment 13 and the accommodation space Q. The opening 12 has a smaller dimension in the path width direction as it extends downward. The opening 12 connects the compartment 13 and the accommodation space Q to each other. In the present embodiment, the opening 12 is closed by the conductive connection pair 9 disposed in the accommodation space Q. The thermosensitive line 3 located in the compartment 13 is in contact with the conductive connection pair 9. In the example in FIG. 6, the dimension of the accommodation space Q in the vertical direction corresponds to the dimension of the conductive connection pair 9 (first body 14*b* in this example) in the vertical direction. The dimension of the accommodation space Q in the vertical direction is the same as the dimension of the first body 14*b* in the vertical direction. Although not shown, the dimension of the accommodation space Q in the vertical direction is also the same as the dimension of the second body 15*b* in the vertical direction. Thus, when the accommodation space Q accommodates the conductive connection pair 9, the opening 12 is closed by the conductive connection pair 9. The procedure of connecting the first line 6 and the second line 7 to each other and accommodating the thermosensitive line 3 in the insulating cover 10 will be described below with reference to FIG. 5.

First, the thermosensitive line 3 is attached to the first cover section 10*a* and the second cover section 10*b* without the first connection 14 and the second connection 15 being attached. More specifically, the thermosensitive line 3 is placed into the accommodation spaces Q in the first cover section 10*a* and the second cover section 10*b*, and the thermosensitive line 3 is pushed into the compartments 13 through the openings 12 in the first cover section 10*a* and the second cover section 10*b* to be attached. The first line 6 to which the first connection 14 has been attached is then attached to the first cover section 10*a*, and the second line 7 to which the second connection 15 has been attached is attached to the second cover section 10*b*. When the fitting portion 14*a* of the first connection 14 is placed into the receiving portion 15*a* of the second connection 15, the first line 6 and the second connection 15 are connected to each other.

Other Embodiments

Power feeders according to other embodiments will now be described.

Figure 7:
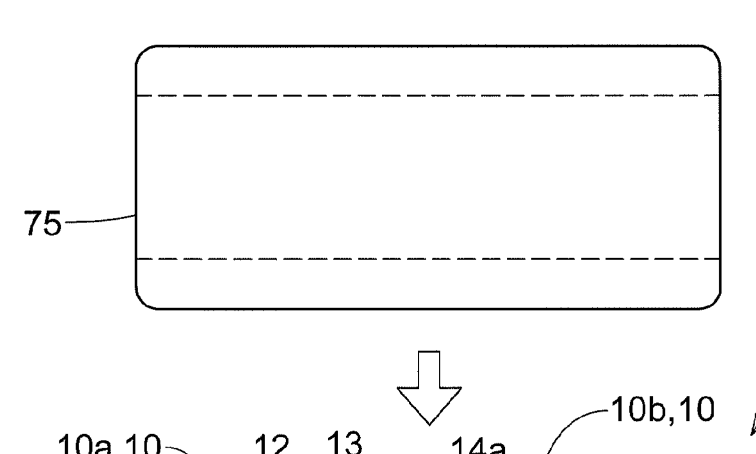
FIG. 7 is a side cross-sectional view of a connector in another embodiment.
Figure 7:
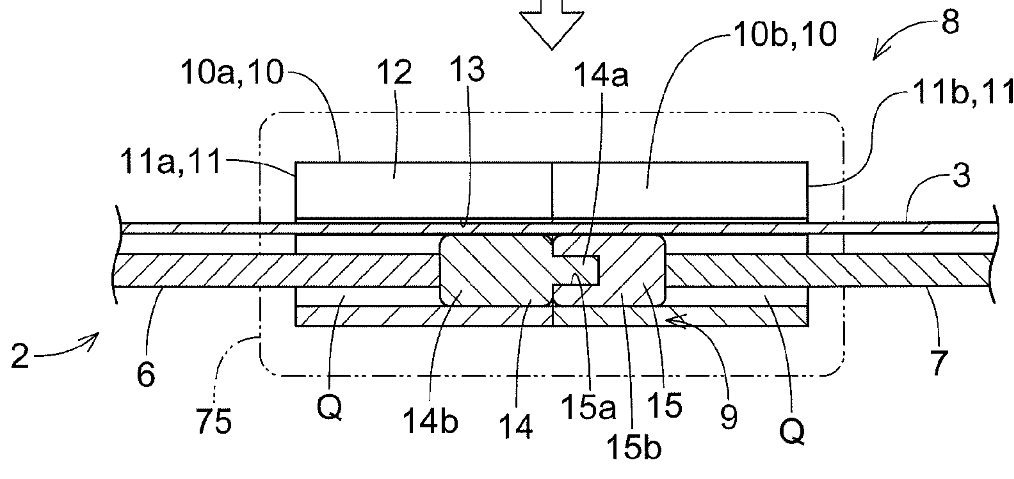

(1) In the first embodiment, each connector 8 includes simply one insulating cover 10 (the first cover section 10*a* and the second cover section 10*b*). In some embodiments, each connector 8 may include more than one insulating cover. For example, each connector 8 may 8 may include multiple insulating covers 10, as in the example shown in FIG. 7. In the example in FIG. 7, the connector 8 includes a second insulating cover 75 for covering the first cover section 10*a* and the second cover section 10*b*. When the second insulating cover 75 is attached to the first cover section 10*a* and the second cover section 10*b* to which the first line 6 and the second line 7 are connected, the connector 8 can improve its strength. The second insulating cover 75 may be divided to correspond to the first cover section 10*a* and the second cover section 10*b*.

Figure 8:
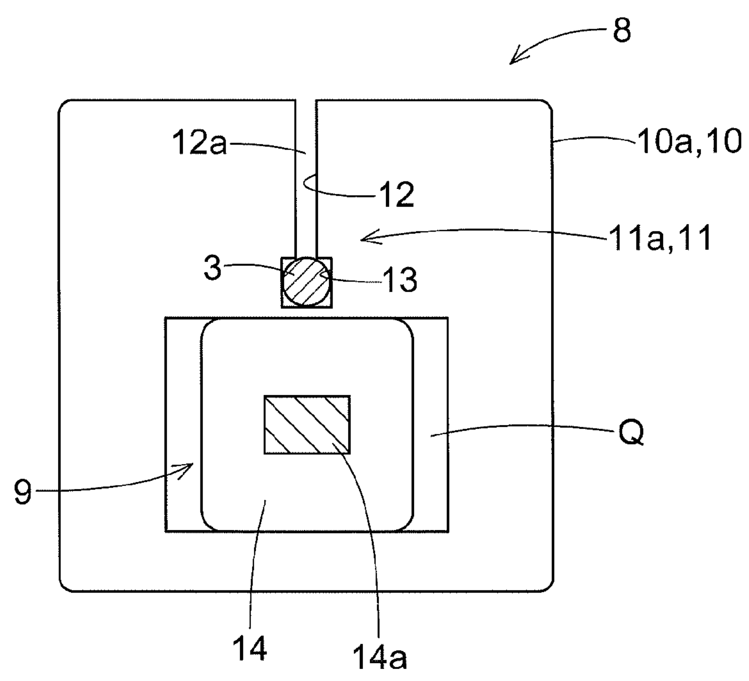
FIG. 8 is a front cross-sectional view of a connector in another embodiment.

(2) In the first embodiment, the opening 12 has a smaller dimension in the path width direction as it extends upward, and the thermosensitive line 3 accommodated in the compartment 13 and the conductive connection pair 9 accommodated in the accommodation space Q are in contact with each other. In some embodiments, the opening 12 may not have a smaller dimension in the path width direction as it extends upward, and the thermosensitive line 3 accommodated in the compartment 13 and the conductive connection pair 9 accommodated in the accommodation space Q may not be in contact with each other, as in the example shown in FIG. 8. In the example in FIG. 8, the opening 12 has a uniform dimension in the path width direction. In this manner, the dimension of the opening 12 in the path width direction may be changed as appropriate. In the illustrated example, the compartment 13 is not open to the accommodation space Q, and a wall is located between the compartment 13 and the accommodation space Q. The thermosensitive line 3 accommodated in the compartment 13 is thus not in contact with the conductive connection pair 9.

(3) In the first embodiment, the opening 12 has the opening width S smaller than the diameter R of the thermosensitive line 3. In some embodiments, the opening 12 may have the opening width S greater than or equal to the diameter R of the thermosensitive line 3. In this case, to prevent the thermosensitive line 3 from slipping off the opening 12, each connector 8 may 8 may be tied around with multiple cable ties.

(4) In the second embodiment, the opening 12 is closed by the conductive connection pair 9 accommodated in the accommodation space Q. In some embodiments, the opening 12 may 12 may not be closed by the conductive connection pair 9 accommodated in the accommodation space Q. For example, when the dimension of the accommodation space Q in the vertical direction is greater than the dimension of the conductive connection pair 9 in the vertical direction, a gap may be left between the upper end of the conductive connection pair 9 and the opening 12.

Figure 9:
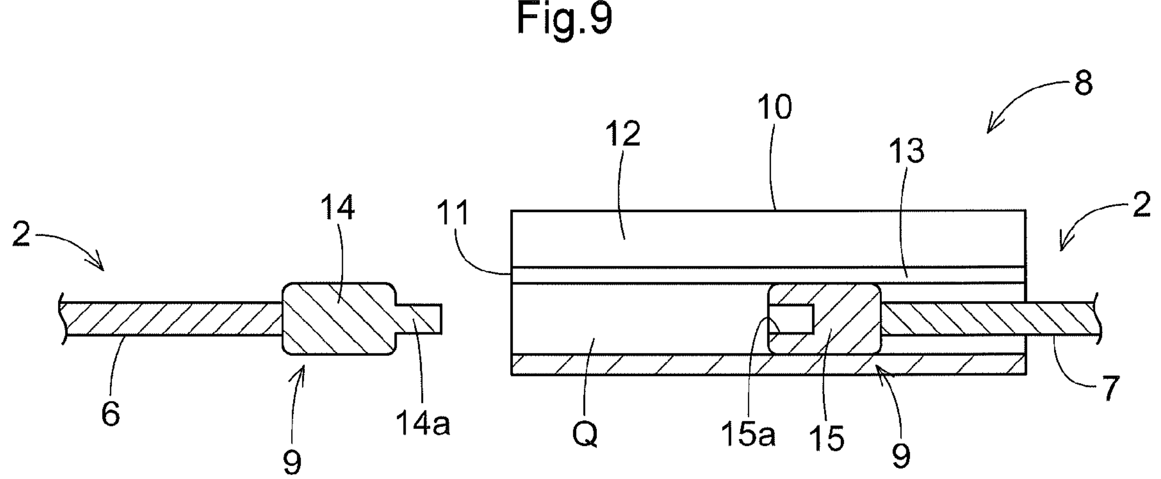
FIG. 9 is a side cross-sectional view of a connector in another embodiment.

(5) In each embodiment, the insulating cover 10 includes the first cover section 10*a* that covers the first connection 14 and the second cover section 10*b* that covers the second connection 15. In some embodiments, the insulating cover 10 may not be divided into the first cover section 10*a* and the second cover section 10*b* as in the example shown in FIG. 9. In the example in FIG. 9, the insulating cover 10 has a dimension in the extension direction of the feed lines 2 to accommodate the first cover section 10*a* and the second cover section 10*b*. With the insulating cover 10 fixed to either the first connection 14 or the second connection 15, the other connection (the first connection 14 or the second connection 15) may be attached to the insulating cover 10. Both the first connection 14 and the second connection 15 are thus covered with the single insulating cover 10. The first cover section 10*a* and the second cover section 10*b* may have different dimensions in the extension direction of the feed lines 2, as in the example shown in FIG. 10. In the example in FIG. 10, the first cover section 10*a* has a smaller dimension than the second cover section 10*b* in the extension direction of the feed lines 2. The first connection 14 has its distal end protruding from the first cover section 10*a*, and the second cover section 10*b* has its distal end farther than the second connection 15. In this manner, the dimensions of the first cover section 10*a* and the second cover section 10*b* in the extension direction of the feed lines 2 may be changed as appropriate.

(6) The structure described in each of the above embodiments may be combined with any other structures described in the other embodiments (embodiments described as other embodiments may also be combined) unless any contradiction arises. The embodiments described herein are merely illustrative in all aspects and may be modified variously as appropriate without departing from the spirit and scope of the present disclosure.

Overview of Embodiments

The power feeders described above are overviewed below.

A power feeder according to one or more embodiments of the present disclosure includes a feed line along a movement path for a movable body to supply power contactlessly to the movable body, and a thermosensitive line along the movement path together with the feed line. The feed line includes a first line, a second line, and a connector connecting the first line and the second line to each other. The connector includes a conductive connection pair electrically connecting the first line and the second line to each other, and an insulating cover covering the conductive connection pair. The insulating cover is formed from an insulating material. The insulating cover has a groove extending in an extension direction of the feed line. The thermosensitive line is disposed in the groove.

In this structure, the first line and the second line in the feed line are connected to each other with the connector. The connector includes the insulating cover formed from an insulating material and covering the conductive connection pair. The first line and the second line can thus be easily connected, with the connection between the first line and the second line covered with the insulating cover formed from an insulating material. Compared with a structure including the first line and the second line in the feed line connected with, for example, a terminal block, this structure is more likely to simplify installation of the feed line and facilitate the safety with less exposure of an energized portion to outside after the installation.

In this structure, the groove on the insulating cover extends in the extension direction of the feed line. Thus, placing the thermosensitive line into the groove completes the installation of the thermosensitive line along the feed line, and simplifies installation of the thermosensitive line.

In this structure, the thermosensitive line is disposed in the groove on the insulating cover. Thus, as compared with a structure including the thermosensitive line along the outer surface of the insulating cover, this structure has less variation in the positional relationship between the thermosensitive line and the connector, and allows the thermosensitive line to be nearer the conductive connection pair in the connector. This structure thus facilitates appropriate detection of heat at the conductive connection pair.

In this structure, the power feeder for supplying power contactlessly can appropriately detect heat at or around the feed line with the thermosensitive line installed in a simple manner.

The groove may include an opening being open in an outer peripheral surface of the insulating cover, and a compartment located nearer the conductive connection pair than the opening and accommodating the thermosensitive line. The opening may have an opening width smaller than a diameter of the thermosensitive line.

In this structure, the thermosensitive line is placed into the opening in the outer peripheral surface of the insulating cover to be fitted into the groove and disposed in the compartment. The opening has an opening width smaller than the diameter of the thermosensitive line and thus can prevent the thermosensitive line accommodated in the compartment from easily slipping off the groove. This structure thus simplifies installation of the thermosensitive line.

The insulating cover may have an accommodation space accommodating the conductive connection pair. The groove may have an opening being open to the accommodation space in the insulating cover, and a compartment located farther from the conductive connection pair than the opening and accommodating the thermosensitive line. The opening may be closed by the conductive connection pair disposed in the accommodation space.

In this structure, the thermosensitive line is fitted into the groove through the opening in the insulating cover and disposed in the compartment. In addition, when the conductive connection pair is disposed in the accommodation space in the insulating cover with the thermosensitive line accommodated in the compartment, the thermosensitive line is prevented from slipping off the groove. This structure thus simplifies installation of the thermosensitive line.

The conductive connection pair may include a first connection at an end of the first line, and a second connection at an end of the second line. The insulating cover may include a first cover section covering the first connection, and a second cover section covering the second connection. The groove may include a first groove section on the first cover section and a second groove section on the second cover section. The first cover section and the second cover section may be fitted to each other. The first groove section and the second groove section may extend continuously in the extension direction of the feed line with the first cover section and the second cover section being fitted to each other.

In this structure, the first cover section and the second cover section are fitted to each other, and the first groove section and the second groove section extend continuously in the extension direction of the feed line. This structure thus simplifies installation of the thermosensitive line across the first groove section and the second groove section.

The power feeder according to one or more embodiments of the present disclosure may produce at least one of the effects described above.

The invention claimed is:

1. A power feeder, comprising:
- a feed line along a movement path for a movable body to supply power contactlessly to the movable body; and
- a thermosensitive line along the movement path together with the feed line, and
- wherein:
- the feed line comprises:
  - a first line;
  - a second line; and
  - a connector connecting the first line and the second line to each other,
- the connector comprises:
  - a conductive connection pair electrically connecting the first line and the second line to each other; and
  - an insulating cover covering the conductive connection pair and comprising an insulating material,
- the insulating cover has a groove extending in an extension direction of the feed line, and the thermosensitive line is disposed in the groove.

2. The power feeder according to claim 1, wherein the groove comprises:
- an opening open in an outer peripheral surface of the insulating cover; and
- a compartment located nearer the conductive connection pair than the opening and accommodating the thermosensitive line, and
- wherein the opening has an opening width smaller than a diameter of the thermosensitive line.

3. The power feeder according to claim 1, wherein:
- the insulating cover has an accommodation space accommodating the conductive connection pair,
- the groove has:
  - an opening open to the accommodation space in the insulating cover; and
  - a compartment located farther from the conductive connection pair than the opening and accommodating the thermosensitive line, and
- the opening is closed by the conductive connection pair accommodated in the accommodation space.

4. The power feeder according to claim 1, wherein:
- the conductive connection pair comprises:
  - a first connection at an end of the first line; and
  - a second connection at an end of the second line,
- the insulating cover comprises:
  - a first cover section covering the first connection; and
  - a second cover section covering the second connection,
- the groove comprises:
  - a first groove section on the first cover section; and
  - a second groove section on the second cover section,
- the first cover section and the second cover section are fitted to each other, and
- the first groove section and the second groove section extend continuously in the extension direction of the feed line with the first cover section and the second cover section being fitted to each other.

* * * * *